United States Patent Office 2,821,953
Patented Feb. 4, 1958

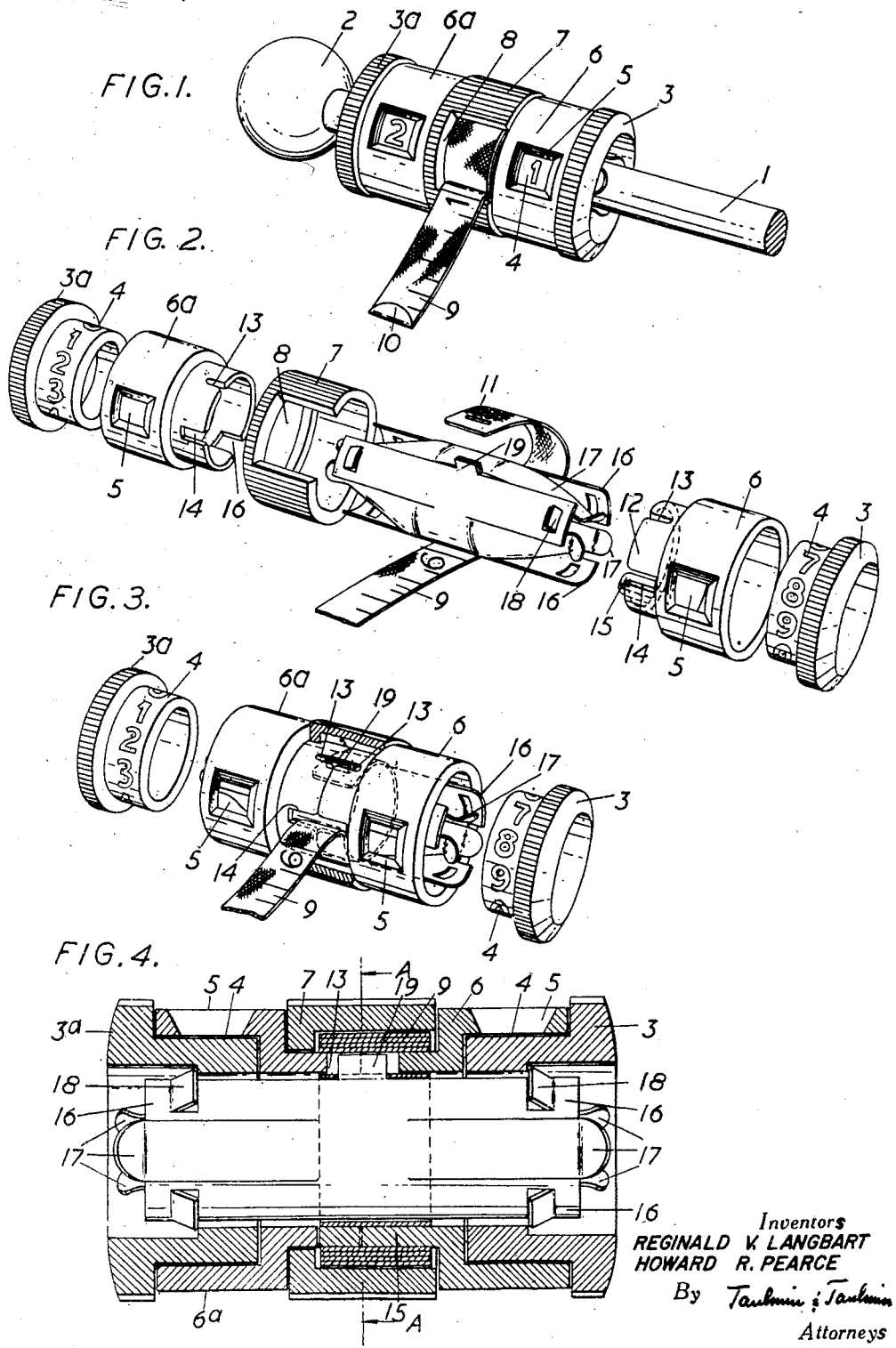

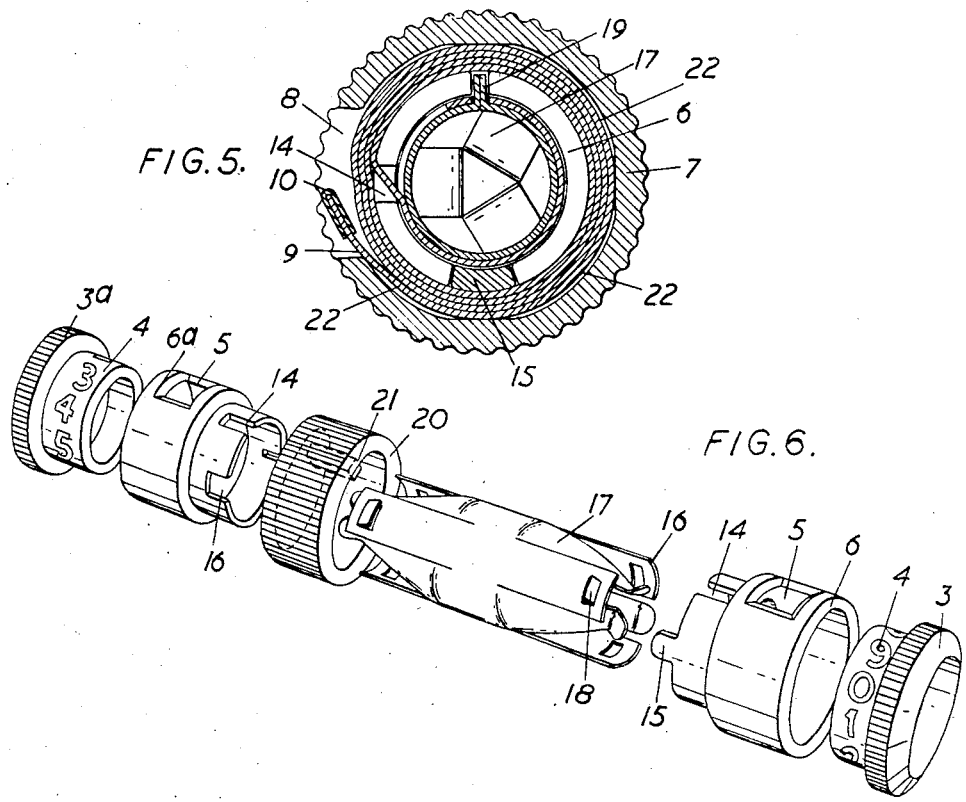

2,821,953

COUNTING OR REGISTERING APPARATUS

Reginald V. Langbart, Boughton, and Howard R. Pearce, Golders Green, London, England, assignors to Toppers of Northampton Limited, London, England Application January 17, 1956, Serial No. 559,647

Claims priority, application Great Britain January 20, 1955

5 Claims. (Cl. 116—131)

This invention is for improvements in counting or registering devices of the type comprising a cylindrical casing carrying one or more rotatable drums having numerals thereon, which numerals are viewable in succession through an aperture or apertures in the casing.

Such a device is employed to record the number of rows of stitches as they are produced in for example hand-knitted fabric, said device having an internal resilient member enabling it to be mounted on the free end of a knitting needle, the user rotating the drum or drums as the fabric is produced. It is with a registering device of this type that this invention is more particularly concerned.

During hand knitting it is often desired to know the length of the given knitted portion. It is desirable therefore to provide a tape measure conveniently at hand.

It is an object of the present invention to provide an improved registering device of the kind herein referred to and a further object of the invention is to provide an improved registering device having in combination therewith a tape measure which may be wound up or extended for measuring purposes as desired.

With the above and other objects in view the invention provides a registering device comprising a hollow sleeve member having an aperture in the side wall thereof, a hollow drum member having figures on the exterior thereof and rotatably mounted within the sleeve member so as to enable the numbers to be brought in succession into view through the aperture and an integral spring inner member located within the bore of the drum and sleeve members to secure them relative to each other and to provide a resilient constriction of the bore.

Conveniently there are two sleeve members each of which may have an axial extension thereto of reduced diameter and with the reduced diameter portions abutting each other. Each sleeve has within its figure a drum with numbers for example 0 to 9 provided thereon and rotatably mounted relative to the sleeve so that each of the numbers may as desired be brought into register with the aperture in the sleeve. A ring is provided encircling the axial extensions to the sleeves which ring may conveniently have a cut-out portion and a tape measure may be secured to the device at some convenient location and arranged to extend through the cut-out portion in the ring. The ring is conveniently rotatably mounted relative to the sleeves so that by firmly holding the sleeves the ring may be rotated and the tape measure wound up around the axial extension portion of the sleeve member.

Alternatively if no tape measure is desired a solid ring may be provided. The end of the tape measure may be provided with a metallic tab or other suitable enlargement and the interior bore of the ring may be provided with enlargements so as to accommodate the tab therein and thus anchor the end of the measure when in the wound up position.

The axial extensions to the sleeves may be provided with means for co-operating with each other to secure the sleeves relative to each other and may furthermore be provided with co-operating longitudinal slots to accommodate the extensions to the resilient inner member to locate said member relative to the sleeves and secondly to permit the tape measure to extend therethrough.

Preferably the resilient inner member is of the kind described and illustrated in co-pending patent application 1767/55.

In one construction one end of the tape measure is provided with a slot which engages the extension to the resilient end member and is thus anchored thereto.

In order that the invention may be more readily understood reference will now be made to the accompanying drawings in which:

Figure 1 is a perspective view of a knitting device according to the present invention.

Figure 2 is an exploded perspective view of a knitting device according to the present invention.

Figure 3 is a part exploded perspective view of a knitting device according to the present invention.

Figure 4 is a cross-section of a knitting device.

Figure 5 is a cross-section on the line AA of Figure 4.

Figure 6 is an exploded perspective view of an alternative knitting device according to the present invention.

Figure 7 is a cross-section similar to Figure 5 of the knitting register illustrated in Figure 6.

A knitting needle has a shank 1 and an enlargement 2 at one end thereof. The needle extends through the centre of a registering device according to the present invention which is comprised of a plurality of interconnecting parts. A central spring member made in accordance with co-pending patent application No. 1767/55 is provided comprising three substantially flat portions 16 each having a detent 18 pressed out and three curved portions 17 which form a constriction in the axial bore of the member to grip the shank of the needle 1.

An extension 19 is provided on the spring member for purposes hereinafter mentioned.

Two rotatable members 3 and 3a having a knurled outer surface are provided with figures 0 to 9 around the periphery thereof. Two sleeves 6 and 6a are provided with an aperture 5 so that one number at a time on the members 3 and 3a may be brought into register with the aperture 5 and viewed therethrough.

The sleeves 6 and 6a are provided with an axially extending portion 12 and 12a having slots 13 and 14 therein. Extension 6 has a tongue 15 and extension 12a has another slot 16. The tongue 15 is arranged to co-operate with the slot 16 and then to bring the slots 13 and 14 in register with each other. A knurled ring 7 is provided with a cut-away portion 8.

A tape measure 9 having a metal tag 10 at one end thereof and with a slot 11 adjacent the other end encircles the members 6 and 6a.

The register is assembled in the following manner.

The slot 11 of the tape measure 9 is placed on the extension 19 of the spring and wound round approximately half a turn. The sleeve 6 is then threaded on the spring and the slot 13 brought into register with the extension 19. The tape measure is allowed to extend away from the spring through the slot 14. The ring 7 is then threaded on and then the other sleeve 6a. The tongue 15 of sleeve 6 registers with the slot 16 of sleeve 6a. The slots 13 and 14 of sleeve 6a simultaneously accommodate the extension 19 and allow the tape measure to extend therethrough respectively. The members 3 and 3a are then inserted into the sleeves 6 and 6a and the detents 18 engage a shoulder provided in the interior bore of the members 3, to locate the members 3 into position as illustrated in cross-section in Figure 4.

It will be appreciated that the tape measure may be wound on by holding the knurled ring 7 and rotating the sleeves 6. To withdraw the tape measure the knurled ring 7 is held and the tape is pulled out causing the sleeves 6 to rotate.

Conveniently the knurled ring 7 is provided with one or more enlargements (Figure 5) within its bore so that the metal tag 10 may be accommodated in one of those enlargements and provides an anchor for the tape measure and prevents withdrawal of the tape measure when not required.

In an alternative construction no tape measure is provided and in place thereof a knurled ring 20 having a bar 21 provided in the bore thereof as a replacement for the knurled ring 7. The bar 21 engages the slots 14 of the axial extensions 12.

What we claim is:

1. A registering device for removable attachment to a rod like member comprising a hollow sleeve member having an aperture in the side wall thereof, a hollow drum member having a reduced diameter end part with figures on the exterior of the end part and rotatably mounted relative to the sleeve member with the end part disposed within the sleeve member so as to enable the figures to be brought in succession into view through the aperture, and an integral spring inner member located within the bore of the drum and sleeve member to secure them relative to each other and to provide a resilient constriction of the bore.

2. A registering device for removable attachment to a rod like member comprising a pair of hollow sleeve members each having an aperture in the side wall thereof adjacent the end thereof, two hollow drum members each having a reduced diameter end part with figures on the exterior surfaces of the end parts and each rotatably mounted relative to one of the sleeve members with the end part disposed in the pertaining sleeve member so as to enable the figures of each drum member to be brought in view in succession through the aperture of the pertaining sleeve member, and an integral spring inner member located within the bore of the drums and sleeve members to secure them relative to each other and to provide a resilient constriction of the bore.

3. A registering device according to claim 2, wherein the sleeve members each have an axial extension of reduced diameter extending toward the center of the device, and a common ring encircling said extensions.

4. A registering device according to claim 3, wherein the said ring is hollow and has an axial slot therein to permit a tape measure to be rolled up inside the ring and about said extension.

5. A registering device for removable attachment to a rod like member comprising; hollow sleeve means having apertures in the side wall thereof adjacent opposite ends of the device, a hollow drum member at each end of the device, each member having a reduced diameter end part with figures on the exterior of the end part and said members being mounted with the end parts thereof disposed within the ends of the sleeve means and rotatable therein so as to enable the figures to be brought in succession into view through the apertures, and a generally cylindrical spring member located inside the drums and sleeve means having means engaging the drums so as to retain the drums and sleeve means in assembled relation, and said spring member having means integral therewith providing a resilient constriction of the bore therethrough.

References Cited in the file of this patent
UNITED STATES PATENTS

| | | |
|---|---|---|
| 2,032,547 | Meade | Mar. 3, 1936 |
| 2,588,935 | Cran | Mar. 11, 1952 |